US006179545B1

(12) United States Patent
Petersen, Jr. et al.

(10) Patent No.: US 6,179,545 B1
(45) Date of Patent: Jan. 30, 2001

(54) FLIP-OVER RAMP

(75) Inventors: Lee B. Petersen, Jr., Castro Valley; John C. Hall, Hayward, both of CA (US)

(73) Assignee: Ricon Corporation, Panorama City, CA (US)

( * ) Notice: Under 35 U.S.C. 154(b), the term of this patent shall be extended for 0 days.

(21) Appl. No.: 09/433,986

(22) Filed: Nov. 4, 1999

(51) Int. Cl.$^7$ .................................................. B65G 67/00
(52) U.S. Cl. ........................ 414/537; 414/921; 14/71.7; 91/223; 91/339; 92/121
(58) Field of Search ................................. 414/921, 537, 414/538, 539; 14/71.1, 71.3, 71.7; 91/223, 339, 260; 92/167, 121

(56) References Cited

U.S. PATENT DOCUMENTS

| | | |
|---|---|---|
| 4,131,209 | 12/1978 | Manning . |
| 4,294,571 | 10/1981 | Tordella . |
| 4,850,788 | 7/1989 | Dickson . |
| 4,979,867 | 12/1990 | Best . |
| 5,085,555 | 2/1992 | Vartanian . |
| 5,160,236 | 11/1992 | Redding et al. . |
| 5,391,041 | 2/1995 | Stanbury et al. . |
| 5,393,192 | 2/1995 | Hall et al. . |
| 5,676,515 | 10/1997 | Haustein . |
| 5,813,071 | 9/1998 | Breslin et al. . |
| 5,871,329 | * 2/1999 | Tidrick et al. ................... 414/537 |

FOREIGN PATENT DOCUMENTS

| | | | |
|---|---|---|---|
| 2477012 | * 9/1981 | (FR) | ................ 414/921 |
| 2626823 | * 8/1989 | (FR) | ................ 414/537 |

* cited by examiner

Primary Examiner—Frank E. Werner
(74) Attorney, Agent, or Firm—Thomas I. Rozsa; Tony D. Chen; Jerry Fong

(57) ABSTRACT

A flip-over ramp assembly is normally stowed in a horizontal position in a recess in a vehicle floor, and can be pivoted upward and outwards to a downward sloping deployed position, after the vehicle door has been opened. The flip-over ramp assembly comprises a mounting enclosure and a ramp which are pivotably connected at their adjacent edges by a hinge which provides a horizontal axis for movement of the ramp between deployed and stowed positions. A driving mechanism comprises an actuator and a driving shaft which is rotatably connected to the actuator. A pair of linkage assemblies are connected to the driving shaft, where the actuator drives the driving shaft which in turn moves the linkage assemblies to lift the ramp to the stowed or deployed position. A positioning cam rotates with the driving shaft for indicating the position of the ramp. A pair of sensors are used with the positioning cam for sensing the position of the ramp, where the sensors transmit a signal to a controller to cut off power to the actuator when the ramp has raised past its vertical position, thereby allowing the ramp to gravity down to the stowed or deployed position.

32 Claims, 7 Drawing Sheets

FLIP-OVER RAMP

BACKGROUND OF THE INVENTION

1. Field of the Invention

The present invention generally relates to the field of ramps. More particularly, the present invention relates to the field of powered assemblies for deploying or stowing a ramp in a vehicle.

2. Description of the Prior Art

Powered movable ramps are widely used for enabling persons who are physically challenged or otherwise have limited mobility to board and leave a vehicle. The following references disclosed various prior art vehicle ramps.

U.S. Pat. No. 4,131,209 issued to Manning on Dec. 26, 1978 discloses a vehicle entrance ramp. A motor bus has a side door at its forward end which when opened accommodates laterally outward extension of a ramp from a normally stowed position below the floor of the bus. A portion of the ramp adjacent the outer end serves as a step for entering the bus when the ramp is in its stowed position.

U.S. Pat. No. 4,294,571 issued to Tordella on Oct. 13, 1981 discloses a van platform with a lockable ramp. The platform includes a housing which is installed upon the floor of a van or truck. The housing includes a first floor located over the van floor to define a storage space therebelow, in which space a ramp is located. The ramp is arranged to be moved out of its retracted position in the housing space to an extended, inclined ramp-functioning position. The ramp includes rollers to facilitate movement of the ramp to the extended position. Upwardly inclined blocks are located within the housing and each includes an indentation for the reception of an associated roller as the ramp reaches a desired position adjacent the top surface of the first floor.

U.S. Pat. No. 4,850,788 issued to Dickson on Jul. 25, 1989 discloses a ramp assembly for trailers and the like. It includes a pair of parallel ramp plates reciprocably supported in tracks under the bed of a trailer. An arresting cam assembly is mounted on the rear of the trailer, and includes a control handle which is connected to and rotates a cam rod which carries and is keyed to a plurality of spaced cam plates. These cam plates are rotated with the cam rod to bring the lobes of the cam plates against the ramp plates, forcing them into a locked status against the underside of the bed of the trailer.

U.S. Pat. No. 4,979,867 issued to Best on Dec. 25, 1990 discloses a ramp which is attached to and used for the loading and unloading of goods from a vehicle. When not in use, the ramp folds compactly and is latched in an upright position at the rear of the vehicle. When in use, the ramp is unfolded and extended in order to transport goods to and from the vehicle.

U.S. Pat. No. 5,085,555 issued to Vartanian on Feb. 4, 1992 discloses a spring biased vehicle access ramp. It includes alternative horizontal and vertical pivot assemblies. A foldable ramp is pivotably attached to a horizontal axis hinge, and vertically pivotable around a vertical rod at a side of a doorway. For deployment to the ground, the ramp is pivoted horizontally and unfolded.

U.S. Pat. No. 5,160,236 issued to Redding et al. on Nov. 3, 1992 discloses a retractable van side door ramp which includes a longitudinally short base end section and a considerably longer outer end section. The ramp and the van floor include coacting guide structures for supporting and guiding the ramp during extension and retraction, but the coacting structure ceases to support and guide the other end portion of the ramp as the ramp moves to its fully extended position.

U.S. Pat. No. 5,391,041 issued to Stanbury et al. on Feb. 21, 1995 discloses a hydraulically operated bus ramp mechanism for deploying a wheelchair ramp at the door of a vehicle. The ramp rotates between a stowed position at which it is flush with the vehicle floor and a deployed position in which it slopes downwardly and outwardly from the vehicle. The ramp is rotated between stowed and extended positions by a hydraulic drive mechanism which includes motor/pump/valve unit and hydraulic cylinder. The mechanism provides a float down feature which permits the ramp to move downward under gravity without the need for operator control and prevents crushing of obstacles that get in the downward path of the ramp.

U.S. Pat. No. 5,393,192 issued to Hall et al. on Feb. 28, 1995 discloses an underfloor extendible ramp for vehicles. It includes a tray mountable under the floor of the vehicle. The tray includes an extendible ramp mechanism which has a ramp and a driving panel for the ramp. The ramp is fulcrumed intermediate its ends on the outer ends of parallel arms extending from the driving panel. A pair of toothed belts driven by a reversible rotating motor are attached to the driving panel for extending and retracting the ramp from the tray.

U.S. Pat. No. 5,676,515 issued to Haustein on Oct. 14, 1997 discloses a low floor vehicle ramp which includes a slide way attached to a bottom side of the vehicle floor proximate a door sill and a boarding-ramp assembly hinged to a ramp-control plate that slides on parallel slide ways as actuated horizontally by motorized bidirectional actuation of a ramp-slide actuator that is affixed to the vehicle and has a horizontally actuating member attached to the ramp-control plate. A floor-access plate forms an access bridge between the boarding-ramp assembly and the vehicle floor.

U.S. Pat. No. 5,813,071 issued to Breslin et al. on Sep. 29, 1998 discloses a telescoping truck loading ramp assembly for facilitating the loading and unloading of a truck. The ramp assembly includes two telescoping ramp sections each having a forward section and a rearward section movable relative to each other between a full length ramp operating configuration and a stowed configuration.

While many different vehicle ramps have been disclosed by the prior art, there remains a need to have a very efficient and also very effective design and construction of an improved flip-over ramp which can be normally stowed in a horizontal position in a recess in a vehicle floor and can also be pivoted upward and outwards to a downward sloping extended position, after the vehicle door has been opened.

SUMMARY OF THE INVENTION

The present invention is an improved flip-over ramp assembly which is normally stowed in a horizontal position in a recess in a vehicle floor, and can be pivoted upward and outwards to a downward sloping deployed position, after the vehicle door has been opened.

The present invention powered flip-over ramp assembly comprises a mounting enclosure and a ramp member which are pivotably connected at their adjacent edges by a hinge which provides a horizontal axis for movement of the ramp member between a deployed position and a stowed position. A driving mechanism comprises an actuator, such as a rotary or linear actuator and a driving shaft which is rotatably connected to the actuator. The driving shaft moves the ramp member by a pair of linkage assemblies. The actuator drives the driving shaft which in turn moves the linkage assemblies to lift the ramp member through an arc cycle from the stowed or deployed position.

The present invention flip-over ramp further comprises a positioning cam which is mounted on the driving shaft and rotates with the driving shaft for indicating the position of the ramp member. A pair of sensors are mounted in the mounting enclosure and located adjacent to the positioning cam for sensing the position of the ramp member. The sensors transmit signals to an electronic controller which cuts off power to the actuator when the ramp member has raised past its vertical position, thereby allowing the ramp member to gravity down to the stowed or deployed position.

It is therefore an object of the present invention to provide a flip-over ramp assembly which has a ramp member rotatable about a horizontal axis between a stowed position inside the vehicle and a deployed position outside the vehicle.

It is also an object of the present invention to provide a flip-over ramp assembly which has a ramp driving mechanism including a hydraulic actuator rotatably connected to a driving shaft which is connected to linkage assemblies to lift a ramp member from a stowed or deployed position.

It is an additional object of the present invention to provide a flip-over ramp assembly which has a ramp driving mechanism including an electrical actuator rotatably connected to a driving shaft which is connected to linkage assemblies to lift a ramp member from a stowed or deployed position.

It is a further object of the present invention to provide a flip-over ramp assembly which has a ramp driving mechanism including a pneumatic actuator rotatably connected to a driving shaft which is connected to linkage assemblies to lift a ramp member from a stowed or deployed position.

It is still a further object of the present invention to provide a flip-over ramp assembly which has a positioning cam for indicating the position of a ramp member.

It is still a further object of the present invention to provide a flip-over ramp assembly which has sensor means for sensing the position of a ramp member and transmitting a signal to a controller means for cutting off power to an actuator when the ramp member has raised past its vertical position, thereby allowing the ramp member to gravity down to a stowed or deployed position.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 7b is a plan view of a positioning cam of the controlling means of the present invention flip-over ramp assembly when viewed from the left side of FIG. 7a;

FIG. 7c is a plan view of the positioning can of the controlling means of the present invention flip-over ramp assembly when viewed from the right side of FIG. 7a;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

For clarity purposes in these figures, some cabling, tubing and wiring are not illustrated, but are conventional in the art and would be easily accomplished by persons skilled in the art.

Figure 1:
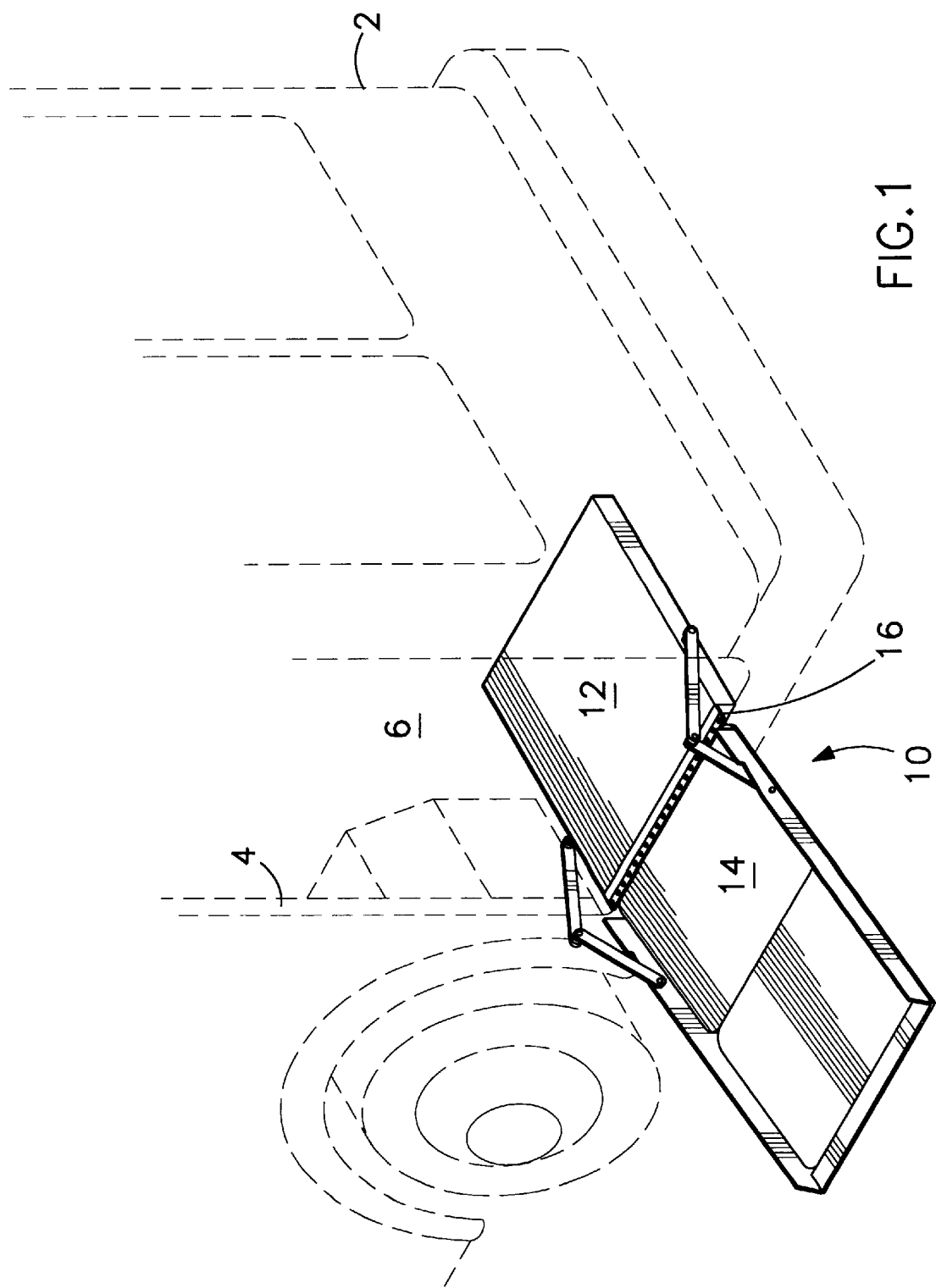
FIG. 1 is a perspective view of the front end of a vehicle having a flip-over ramp assembly in accordance with the present invention, the vehicle chassis being shown in broken lines.
Figure 5:
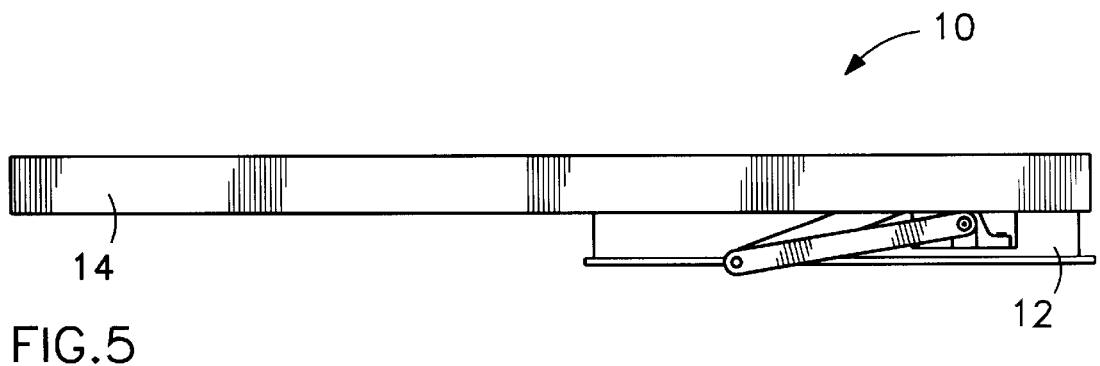
FIG. 5 is a side elevational view of the present invention flip-over ramp assembly in its stowed position.

Referring to FIG. 1, there is shown at 10 the present invention flip-over ramp assembly used at the front doorway 4 or a rear doorway of a vehicle 2, such as a bus or the like. The ramp assembly 10 comprises a mounting enclosure 12 and a generally rectangular shaped ramp member 14. The mounting enclosure 12 is conventionally mounted on the floor 6 adjacent to the doorway 4 of the vehicle. As shown, the mounting enclosure 12 and the ramp member 14 are pivotably connected at their adjacent horizontal edges by a hinge 16 which provides a horizontal axis for movement of the ramp member 14 between an extended or deployed position as shown, where the ramp member 14 slopes down from the vehicle floor to a sidewalk (not shown), and a stowed position inside the vehicle 2, abutting against and parallel to the mounting enclosure 12 (see FIG. 5). This movement involves rotation of the ramp member 14 about the hinge 16.

Figure 2:
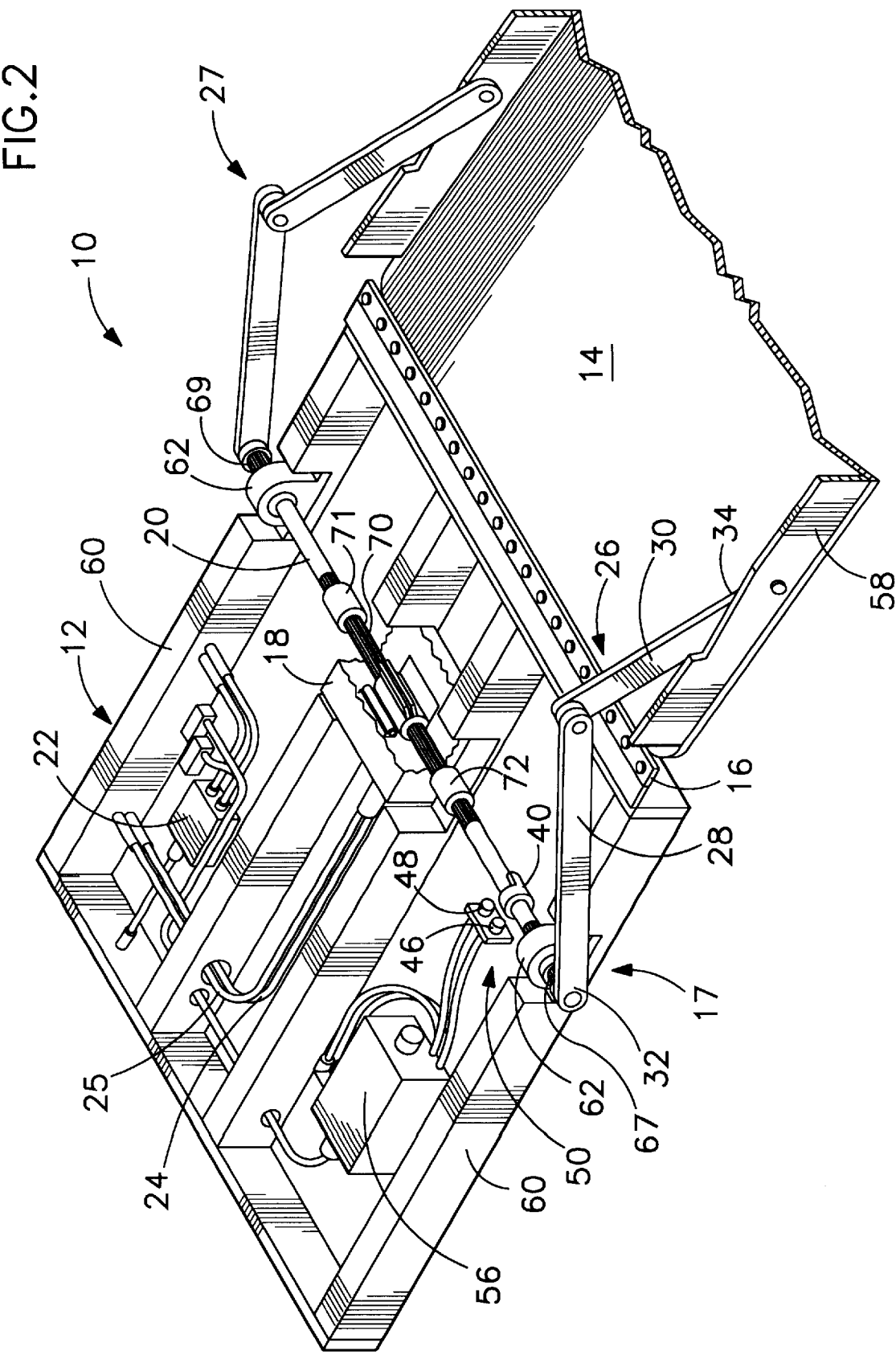
FIG. 2 is a perspective view of the present invention flip-over ramp assembly, showing an open mounting enclosure to better illustrate the components forming a part of the invention.

Referring to FIG. 2, there is shown the interior of the mounting enclosure 12 without its top cover plate and a partial ramp member 14 which can be rotated between the stowed and deployed positions by a ramp driving mechanism 17. The ramp driving mechanism 17 may be powered by hydraulic, electrical or pneumatic means, preferably powered by hydraulic means. The driving mechanism 17 comprises an actuator 18 and a horizontal driving shaft 20 or driving means which is rotatably connected to the actuator 18 and extends to the sides 60 of the mounting enclosure 12 and secured thereto by mounting brackets 62. The actuator 18 may be rotary or linear, preferably rotary actuator is used. The actuator 18 is an off-the-shelf component manufactured by Micro-Precision Textron and is installed in the mounting enclosure 12 located adjacent to the adjacent horizontal edge of the ramp member 14. The rotary actuator 18 is connected to a hydraulic control unit 22 by hydraulic lines 24 and 25.

Figure 3:
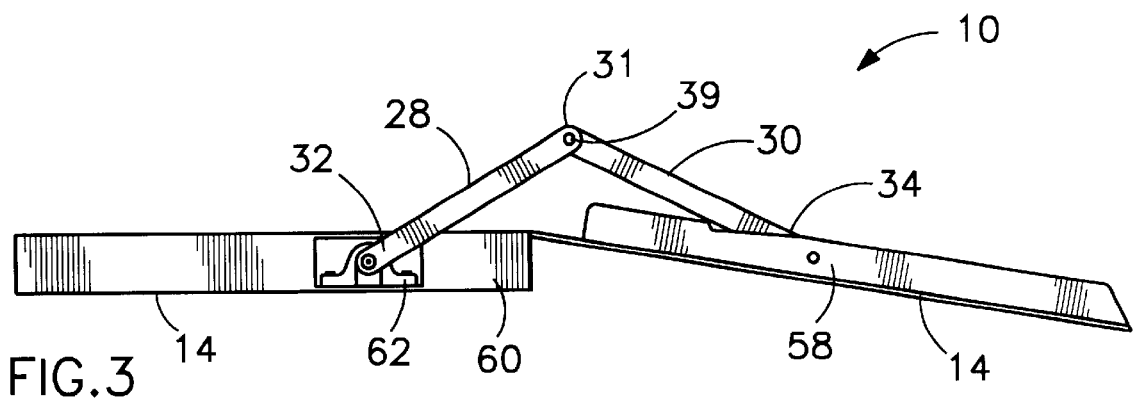
FIG. 3 is a side elevational view of the present invention flip-over ramp assembly, showing one of the two linkage assemblies with the ramp member in a deployed position.
Figure 4:
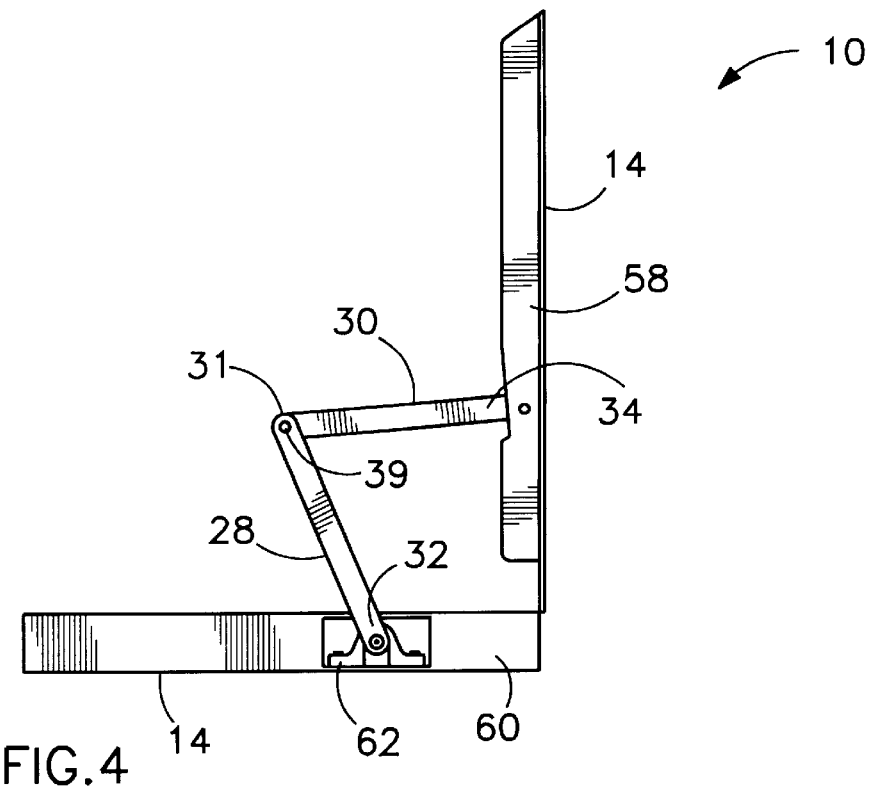
FIG. 4 is a side elevational view of the present invention flip-over ramp assembly, showing one of the two linkage assemblies with the ramp member raised pass its vertical position.

Referring to FIGS. 2, 3 and 4, the driving shaft 20 moves the ramp member 14 along an arc path by means of a pair of opposite pivotable linkage assemblies 26 and 27. For ease of understanding, only the left linkage assembly 26 will be described in detail since it should be understood that the right linkage assembly 27 is identical to the left linkage assembly 26. The linkage assembly 26 comprises a first arm 28 and a second arm 30, and both are pivotably connected at their adjacent ends 31 by a pivot pin 39 or other suitable means. The free end 32 of the first arm 28 is coupled to an end of the driving shaft 20 while the free end 34 of the second arm 30 is attached to the sidewall 58 of the ramp member 14.

Figure 6:
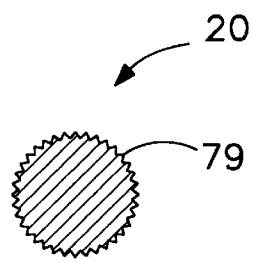
FIG. 6 is a cross-sectional view of the splined structure of the driving shaft of the present invention flip-over ramp assembly.
Figure 7A:
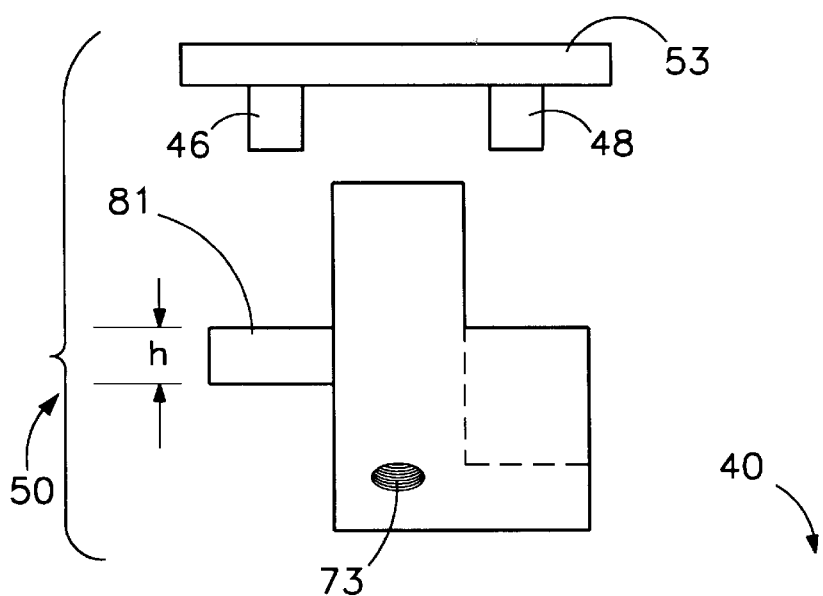
FIG. 7a depicts an indicating means of the present invention flip-over ramp assembly.
Figure 7B:
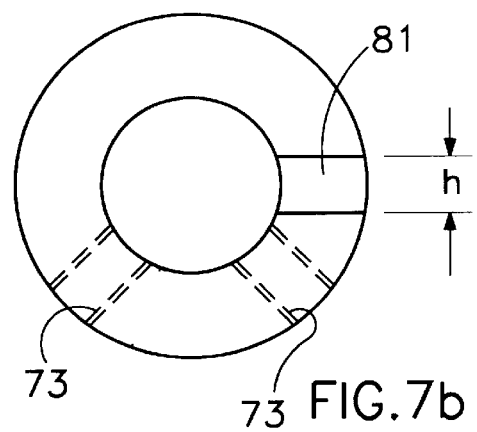
Figure 7C:
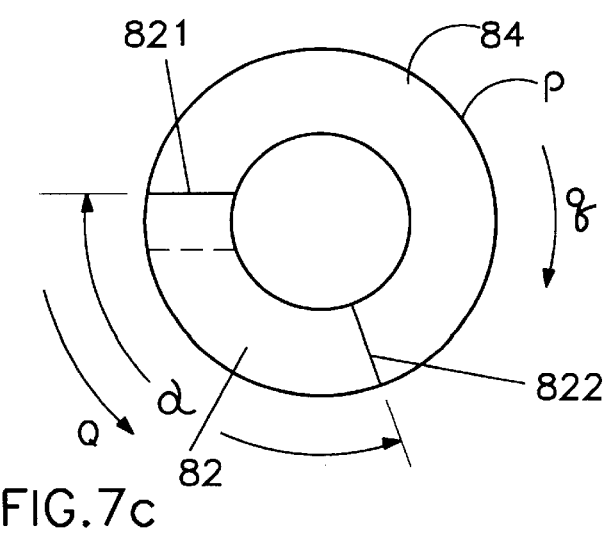

Referring to FIGS. 2 and 6, the driving shaft 20 is an elongated cylinder which may be constructed of three pieces 67, 69 and 70 or an integral piece. These pieces 67, 69 and 70 may be configured with splined structure 79 surrounding the circumference of the driving shaft 20 and extending along the length of the driving shaft 20 or only portions of the driving shaft 20 as shown. These splined structures 79 are located at the ends and middle of the driving shaft 20. These splined structures 79 facilitate the interconnection of the free end 32 of the first arm 28 of the linkage assemblies 26 and 27. Bushings 71 and 72 are provided to interconnect the relative pieces together to form the driving shaft 20. The middle piece 70 may also have the splined structure engaged with the actuator 18.

Referring to FIGS. 2, 3 and 4, the rotary actuator 18 drives the driving shaft 20 which in turn moves the linkage assemblies 26 and 27 to lift the ramp member 14 through the arc path or cycle from the stowed or deployed position. The ramp member 14 is capable of moving to and reversing direction at any point through its' arc path without having to complete its stowed cycle or deployed cycle. The arc path has an upward half movement and a downward half movement.

The present invention flip-over ramp assembly 10 provides a gravity-down feature which permits the operator to allow the ramp member 14 to gravity down either to the stowed or deployed position without further operator assistance or the downward half movement of the arc path. The gravity-down feature permits the operator to lift the ramp member 14 under hydraulic power to just past the vertical position. Thereafter, the operator may turn off the power to the hydraulic control unit 22 and permit the ramp member 14 to gravity down either to the stowed or deployed position without further operator assistance. This allows the operator to assist the passenger to his or her seat or to attend other duties away from the hydraulic controls without having to wait until the ramp member 14 is fully stowed or deployed.

A switch (not shown) is located in the vehicle 2 in a location convenient to the operator, for example, on the vehicle dashboard. The switch may be a two position switch connected to the vehicle's electrical system. The switch may be spring biased to the neutral or off position. Movement of the switch to the deploy/stow position applies electrical power to the hydraulic control unit 22, which pressurizes the hydraulic line 24. With the switch held in the deploy position, the feed line 24 is opened to deliver hydraulic fluid pressure to the rotary actuator 18. This causes the ramp driving mechanism 17 to initiate a deploy cycle causing the ramp member 14 to begin the upward half movement of the arc path from the stowed position.

Once ramp member 14 has been raised past its vertical position (see FIG. 4) and is beginning the downward half movement of the arc path toward the deployed position, the operator releases switch which returns under spring pressure to the neutral position thereby cutting off power to the hydraulic control unit 22, so that the ramp member 14 falls under the force of gravity. A flow control regulator or valve 57 (see FIGS. 8 and 9) in hydraulic line 24 acts to throttle the hydraulic fluid and slow or damp the descent of the ramp member 14.

One thing needs to be pointed out that even the operator doesn't release the switch, the power to the hydraulic control unit 22 will still be cut off by the electronic controller unit 56 when the ramp member 14 is beginning the downward half movement of the arc path toward the deployed position. This is also true when the ramp is beginning the downward half movement of the arc path toward the stowed position if the ramp moves reversely, in this case from the deployed position to the stowed position. In any event, the ramp member 14 moves under its own gravity force once it is passing over the vertical position. This is a unique safety feature of the present invention flip-over ramp assembly.

In the event that a passenger or other objects is in the way of the descending ramp member 14, there is no danger of crushing or injury as the ramp member 14 is not being hydraulically driven while descending in the gravity down mode.

After the ramp member 14 is fully deployed and the passenger has entered or exited the vehicle, the operator holds the switch to the stow position, the feed line 25 is opened to deliver hydraulic fluid pressure to the rotary actuator 18. This causes the ramp driving mechanism 17 to initiate a stow cycle to begin the upward half movement of the arc path from the deployed position.

Once the ramp member 14 has been raised past its vertical position, and is beginning the downward half movement of the arc path towards the stowed position, the power to the hydraulic control unit 22 cuts off and permitting the ramp member 14 to gravity down to the stowed position. The downward motion of the ramp member 14 is slowed or damped by the throttling effect of a flow regulator or valve 57 in the hydraulic line 25.

The drive mechanism 17 permits the ramp member 14 to be moved manually in the event of a power failure, without the need of disconnecting the rotary actuator 18 from the driving shaft 20. A manual override system (not shown) is provided so that when there is a power failure, the ramp member 14 can be simply operated by hand operation where the operator can lift the ramp member 14 to the stowed or deployed position with little effort. The manual override system is conventional in the art and the description thereof will not be described. The ramp member 14 can be moved manually, requiring only sufficient force to overcome its weight and the hydraulic fluid pressure drop across the hydraulic lines 24 and 25. Once the operator has lifted the ramp member 14 to just past its vertical position, it can be released and allowed to gravity down in a controlled manner as described above.

Referring to FIGS. 2, 7a, 7b and 7c, there are shown an indicating means 50 which includes a positioning cam 40 and a pair of sensors means 46 and 48. The positioning cam 40 functions as a sensor target to the sensor means 46 and 48 and is mounted on the driving shaft 20 by set screws or other suitable means which are threaddedly engaged with threaded apertures 73 provided on the positioning cam 40. The positioning cam 40 rotates with the driving shaft 20 for indicating the position of the ramp member 14. The positioning cam 40 is formed with cam structures on its two outer ends. One end of the positioning cam 40 has a protruding portion 81 projected outwardly. The protruding portion 81 has a width "h" extended along the axial of the driving shaft 20. The protruding portion 81 indicates that the ramp member 14 is in a fully stowed position. The other end of the positioning cam 40 has also a protruding portion 82 projected outwardly and forms an acute arc angle α with two relative end walls 821 and 822 which define the rest of an open portion 84 around the driving shaft 20. The protruding portion 82 extends along the axial of the driving shaft 20 for indicating that the ramp member 14 is in a deploying or stowing position.

Figure 8:
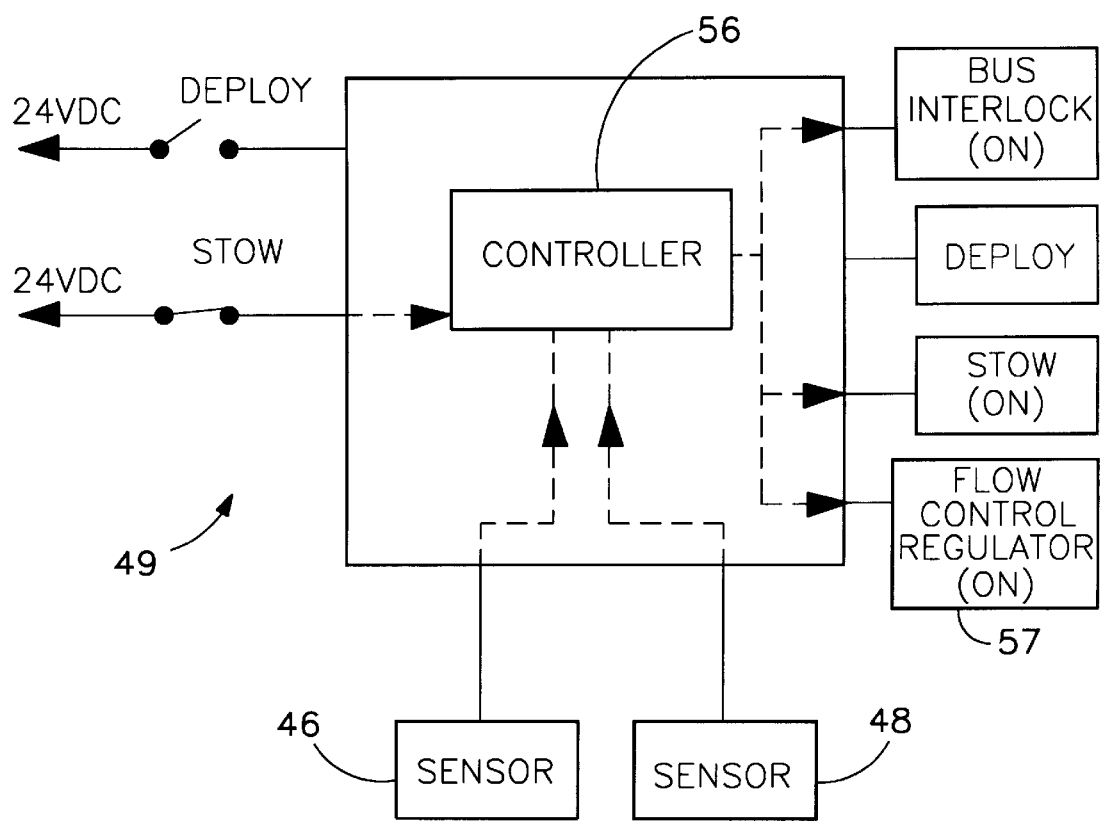
FIG. 8 is a simplified block diagram of a power control of the present invention flip-over ramp assembly, showing the stow operation.
Figure 9:
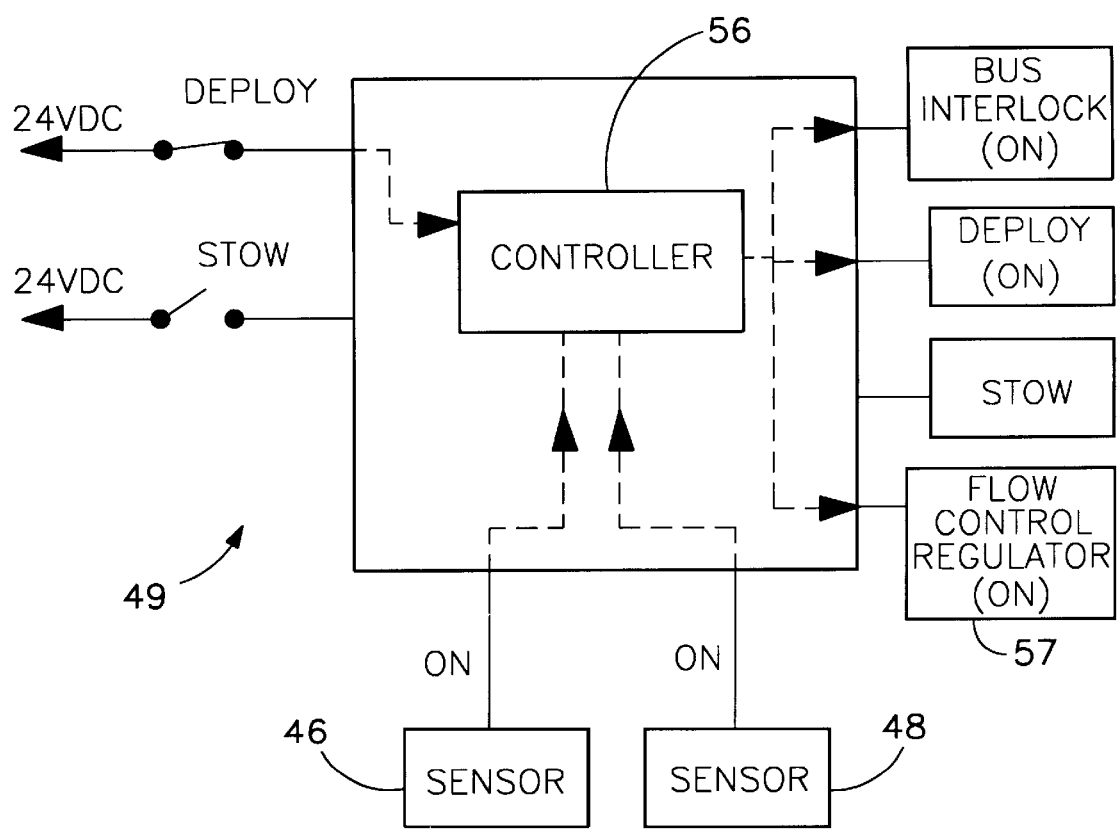
FIG. 9 is a simplified block diagram of the power control of the present invention flip-over ramp assembly, showing the deploy operation.

Referring to FIGS. 2, 8 and 9, the pair of sensors 46 and 48 are mounted on a bracket 53 which is mounted to the mounting enclosure 12. These sensors 46 and 48 are electrically connected to an electronic controller unit 56 to sense the sensor target 40 and detect the position of the ramp member 14. Specifically, the sensor 46 is positioned facing the protruding portion 81 of the positioning cam 40 while the sensor 48 is positioned facing the protruding portion 82 of the positioning cam 40. Only when the protruding portion 81 is directly facing the sensor 46, the vehicle brakes, accelerator, door and transmission, etc., can be released since the ramp member 14 is in a fully stowed position. If the protruding portion 81 is rotated and passed the sensor 46, all the vehicle interlocks such as brakes, transmission, accelerator and door will be set as a safety feature.

Referring again to FIGS. 2, 7a, 7b and 7c, when the driving shaft 20 moves counter clockwise, the protruding portion 82 is directly facing the sensor 48 which transmits a signal to the controller unit 56, which in turn activates the hydraulic control unit 22 to rotate the driving shaft 20 away from an edge 821 of the protruding portion 82. This movement follows the direction of the arrow "Q" shown in FIG. 7c, for example, it indicates that the ramp member 14 has moved from a horizontal stowed position to a deployed position. As soon as the sensor 48 has passed an edge 822 of the protruding portion 82, which indicates the ramp member 14 has raised past its vertical position, the controller unit 56 cuts off the power of the hydraulic actuator 18 through a programmable logic control circuit (not shown) in the controller unit 56, and thereby the ramp member 14 will continue deploying under its gravity force until it reaches a ground landing position (see FIG. 7c, the driving shaft stops at position "P").

When a stowed switch is being activated, the controller unit 56 will energize the hydraulic actuator 18 to turn the driving shaft 20 in a reversing direction, in this case it rotates from the position "P" along the direction of the arrow "q" which indicates that the ramp member 14 has moved from a fully deployed position to a stowed position. When the sensor 48 senses the protruding portion 82, it indicates that the ramp member 14 rotates pass its vertical position, it transmits a signal to the controller unit 56 to turn off the hydraulic actuator 18 as to move the ramp member 14 to the fully stowed position under its own gravity force.

It will be appreciated that the structure of the positioning cam 40 described above is merely one illustrative embodiment and can include many other comparable structure.

Obviously, by modifying the programmable logic circuit in the controller unit 56, the protruding portion 82 can be also used as a signal indicator for the ramp stow motion.

Referring to FIG. 8, there is shown a simplified block diagram of a power control 49 of the present invention flip-over ramp assembly 10, showing the stow operation.

Referring to FIG. 9, there is shown a simplified block diagram of the power control 49 of the present invention flip-over ramp assembly 10, showing the deploy operation.

The present invention flip-over ramp assembly conforms to conventional forms of manufacture or any conventional way known to one skilled in the art.

Defined in detail, the present invention is a movable ramp assembly for use in conjunction with a vehicle having a door opening and a floor, the ramp assembly comprising: (a) a mounting enclosure mounted on the floor adjacent to the door opening; (b) a ramp member pivotable connected to the mounting enclosure adjacent to the door opening and movable along an arc path through the door opening between a stowed position within the vehicle to a deployed position outside the vehicle, the path including an upward movement half and a downward movement half; (c) a hydraulic rotary actuator mounted in the mounting enclosure; (d) a horizontal driving shaft rotatably connected to the rotary actuator for axially rotation; (e) a pair of opposite pivotable linkage assemblies, each having a first arm and a second arm, the first and second arms pivotably connected at their adjacent ends, the free end of the first arm connected to an end of the driving shaft and the free end of the second arm pivotably connected to the ramp member; (f) means for controlling the rotary actuator to drive the driving shaft which in turn moves the pair of linkage assemblies to lift the ramp member in the upward movement half of the path but allowing the ramp member to gravity down in the downward movement half of the path; (g) a positioning cam mounted on the driving shaft for indicating the position of the ramp member; and (h) sensor means located adjacent to the positioning cam for sensing the position of the ramp member and transmitting a signal to the controlling means to cut off power to the rotary actuator when the ramp member has raised past its vertical position.

Defined broadly, the present invention is a movable ramp assembly for use in conjunction with a vehicle having a door opening and a floor, the ramp assembly comprising: (a) a mounting enclosure mounted on the floor adjacent to the door opening; (b) a ramp pivotable connected to the mounting enclosure adjacent to the door opening and movable along an arc path between a stowed position and a deployed position, the path including an upward movement half and a downward movement half; (c) a rotary actuator mounted in the mounting enclosure; (d) a driving shaft rotatably connected to the rotary actuator for axially rotation; (e) at least one pivotable linkage assembly having a first arm and a second arm, the first and second arms pivotably connected at their adjacent ends, the free end of the first arm connected to an end of the driving shaft and the free end of the second arm pivotably connected to the ramp; (f) the rotary actuator driving the driving shaft which in turn moves the at least one linkage assembly to lift the ramp in the upward movement half of the path; and (g) means for controlling the rotary actuator to lift the ramp through the at least one linkage assembly in the upward movement half of the arc path, but allowing the ramp to gravity down in the downward movement half of the arc path.

Defined more broadly, the present invention is a ramp assembly for use in conjunction with a vehicle to facilitate passengers boarding and leaving the vehicle, the ramp assembly comprising: (a) a ramp movable along an arc path between a stowed position and a deployed position, the path including an upward movement half and a downward movement half; (b) a rotary actuator; (c) driving means rotatably connected to the rotary actuator; (d) at least one linking assembly connecting the ramp and the driving means, such that the rotary actuator rotates the driving means which in turn moves the at least one linking assembly to lift the ramp through the upward movement half of the arc path; and (e) means for controlling the rotary actuator to lift the ramp through the at least one linking assembly in the upward movement half of the arc path, but allowing the ramp to gravity down in the downward movement half of the arc path.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A ramp assembly for use in conjunction with a vehicle to facilitate passengers boarding and leaving the vehicle, the ramp assembly comprising:
    a. a ramp movable along an arc path between a stowed position and a deployed position, the path including an upward movement half and a downward movement half;
    b. a rotary actuator;
    c. driving means rotatably connected to said rotary actuator;
    d. at least one linking assembly connecting said ramp and said driving means, such that said rotary actuator rotates said driving means which in turn moves said at least one linking assembly to lift said ramp through said upward movement half of said arc path, said at least one linking assembly including a first arm and a second arm, the first and second arms pivotably connected at their adjacent ends, the free end of the first arm connected to said driving means which is connected to said rotary actuator and the free end of the second arm pivotably connected to said ramp; and
    e. means for controlling said rotary actuator to lift said ramp through said at least one linking assembly in said upward movement half of said arc path, but allowing said ramp to gravity down in said downward movement half of said arc path.

2. The ramp assembly in accordance with claim 1, wherein said controlling means includes an electronic controller unit.

3. The ramp assembly in accordance with claim 1, further comprising means for indicating the position of said ramp.

4. The ramp assembly in accordance with claim 3, wherein said indicating means includes a positioning cam and sensor means.

5. The ramp assembly in accordance with claim 4, wherein said positioning cam is mounted on said driving means for indicating the position of said ramp.

6. The ramp assembly in accordance with claim 4, wherein said sensor means is located adjacent to said positioning cam for sensing the position of said ramp and transmitting a signal to said controlling means to cut off power to said rotary actuator when said ramp has raised past its vertical position, thereby allowing said ramp to gravity down in said downward movement half of said arc path.

7. The ramp assembly in accordance with claim 1, wherein said ramp can be further moved manually through said arc path.

8. The ramp assembly in accordance with claim 7, further comprising means for damping the manual movement of said ramp under manual rotation.

9. The ramp assembly in accordance with claim 8, wherein said damping means includes a valve for restricting the flow of pressure from said rotary actuator.

10. The ramp assembly in accordance with claim 1, wherein said rotary actuator is powered by hydraulic means.

11. The ramp assembly in accordance with claim 1, wherein said rotary actuator is powered by electrical means.

12. The ramp assembly in accordance with claim 1, wherein said rotary actuator is powered by pneumatic means.

13. The ramp assembly in accordance with claim 1, wherein said driving means is formed of a splined structure for providing easy attachment and adjustment of said at least one linking assembly relative to said ramp.

14. A movable ramp assembly for use in conjunction with a vehicle having a door opening and a floor, the ramp assembly comprising:
    a. a mounting enclosure mounted on said floor adjacent to said door opening;
    b. a ramp pivotable connected to said mounting enclosure adjacent to said door opening and movable along an arc path between a stowed position and a deployed position, the path including an upward movement half and a downward movement half;
    c. a rotary actuator mounted in said mounting enclosure;
    d. a driving shaft rotatably connected to said rotary actuator for axially rotation;
    e. at least one pivotable linkage assembly having a first arm and a second arm, the first and second arms pivotably connected at their adjacent ends, the free end of the first arm connected to an end of said driving shaft and the free end of the second arm pivotably connected to said ramp;
    f. said rotary actuator driving said driving shaft which in turn moves said at least one linkage assembly to lift said ramp in said upward movement half of said path; and
    g. means for controlling said rotary actuator to lift said ramp through said at least one linkage assembly in said upward movement half of said arc path, but allowing said ramp to gravity down in said downward movement half of said arc path.

15. The ramp assembly in accordance with claim 14 wherein said controlling means includes an electronic controller unit.

16. The ramp assembly in accordance with claim 14 further comprising means for indicating the position of said ramp.

17. The ramp assembly in accordance with claim 16 wherein said indicating means includes a positioning cam and sensor means.

18. The ramp assembly in accordance with claim 17 wherein said positioning cam is mounted on said driving shaft for indicating the position of said ramp.

19. The ramp assembly in accordance with claim 17 wherein said sensor means is located adjacent to said positioning cam for sensing the position of said ramp and transmitting a signal to said controlling means to cut off power to said rotary actuator when said ramp has raised past its vertical position, thereby allowing said ramp to gravity down in said downward movement half of said arc path.

20. The ramp assembly in accordance with claim 14, wherein said ramp can be further moved manually through said arc path.

21. The ramp assembly in accordance with claim 20, further comprising means for damping the manual movement of said ramp under manual rotation.

22. The ramp assembly in accordance with claim 21, wherein said damping means includes a valve for restricting the flow of pressure from said rotary actuator.

23. The ramp assembly in accordance with claim 14, wherein said rotary actuator is powered by hydraulic means.

24. The ramp assembly in accordance with claim 14, wherein said rotary actuator is powered by electrical means.

25. The ramp assembly in accordance with claim 14, wherein said rotary actuator is powered by pneumatic means.

26. The ramp assembly in accordance with claim 14, wherein said driving shaft is formed of a splined structure surrounding a circumference of said driving shaft for providing easy attachment and adjustment of said at least one pivotable linkage assembly relative to said ramp.

27. A movable ramp assembly for use in conjunction with a vehicle having a door opening and a floor, the ramp assembly comprising:

a. a mounting enclosure mounted on said floor adjacent to said door opening;

b. a ramp member pivotable connected to said mounting enclosure adjacent to said door opening and movable along an arc path through said door opening between a stowed position within said vehicle to a deployed position outside said vehicle, the path including an upward movement half and a downward movement half;

c. a hydraulic rotary actuator mounted in said mounting enclosure;

d. a horizontal driving shaft rotatably connected to said rotary actuator for axially rotation;

e. a pair of opposite pivotable linkage assemblies, each having a first arm and a second arm, the first and second arms pivotably connected at their adjacent ends, the free end of the first arm connected to an end of said driving shaft and the free end of the second arm pivotably connected to said ramp member;

f. means for controlling said rotary actuator to drive said driving shaft which in turn moves said pair of linkage assemblies to lift said ramp member in said upward movement half of said path but allowing said ramp member to gravity down in said downward movement half of said path;

g. a positioning cam mounted on said driving shaft for indicating the position of said ramp member; and h. sensor means located adjacent to said positioning cam for sensing the position of said ramp member and transmitting a signal to said controlling means to cut off power to said rotary actuator when said ramp member has raised past its vertical position.

28. The ramp assembly in accordance with claim 27, wherein said controlling means includes an electronic controller unit.

29. The ramp assembly in accordance with claim 27, wherein said ramp member can be further moved manually through said arc path.

30. The ramp assembly in accordance with claim 27, further comprising means for damping the manual movement of said ramp member under manual rotation.

31. The ramp assembly in accordance with claim 30, wherein said damping means includes a valve for restricting the flow of hydraulic pressure from said rotary actuator.

32. The ramp assembly in accordance with claim 27, wherein said driving shaft is formed of a splined structure surrounding a circumference of said driving shaft for providing easy attachment and adjustment of said pair of pivotable linkage assemblies relative to said ramp member.

\* \* \* \* \*